United States Patent
Luce (10) Patent No.: US 10,717,520 B2
(45) Date of Patent: Jul. 21, 2020

(54) SHOCK STRUT WITH INTEGRAL SHRINK PISTON ACTUATOR

(71) Applicant: Goodrich Corporation, Charlotte, NC (US)

(72) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 371 days.

(21) Appl. No.: 15/816,868

(22) Filed: Nov. 17, 2017

(65) Prior Publication Data

US 2019/0152588 A1    May 23, 2019

(51) Int. Cl.
| | |
|---|---|
| *B64C 25/22* | (2006.01) |
| *F16F 9/10* | (2006.01) |
| *F16F 9/43* | (2006.01) |
| *F15B 15/16* | (2006.01) |
| *F15B 15/14* | (2006.01) |
| *F15B 15/24* | (2006.01) |
| *B64C 25/60* | (2006.01) |
| *B64C 25/10* | (2006.01) |
| *F16F 9/56* | (2006.01) |
| *B64C 25/00* | (2006.01) |

(52) U.S. Cl.
CPC .............. *B64C 25/22* (2013.01); *B64C 25/10* (2013.01); *B64C 25/60* (2013.01); *F15B 15/149* (2013.01); *F15B 15/16* (2013.01); *F15B 15/24* (2013.01); *F16F 9/10* (2013.01); *F16F 9/432* (2013.01); *F16F 9/56* (2013.01); *B64C 2025/008* (2013.01); *F16F 2232/08* (2013.01)

(58) Field of Classification Search
CPC .......... B64C 25/22; B64C 25/10; B64C 25/60; B64C 2025/008; F15B 15/149; F15B 15/16; F15B 15/24; F16F 9/10; F16F 9/432; F16F 9/56; F16F 2232/08
See application file for complete search history.

(56) References Cited

U.S. PATENT DOCUMENTS 5,219,152 A * 6/1993 Derrien .............. B60G 17/0416
                                                       267/118
5,908,174 A * 6/1999 Churchill ................ B64C 25/18
                                                       244/102 SS
(Continued)

FOREIGN PATENT DOCUMENTS

EP    0461981    12/1991
EP    2664538    11/2013
(Continued)

OTHER PUBLICATIONS

European Patent Office, European Search Report dated Apr. 26, 2019 in Application No. 18207062.3.

*Primary Examiner* — Rodney A Bonnette
(74) *Attorney, Agent, or Firm* — Snell & Wilmer, L.L.P.

(57) ABSTRACT

A shock strut may comprise a strut cylinder, a strut piston operatively coupled to the strut cylinder, a shrink piston disposed at least partially within the strut cylinder, and a shrink chamber at least partially defined by the shrink piston. The shrink piston may comprise a shrink piston head, a sleeve extending from the shrink piston head, and a mechanical stop. A hydraulic fluid may be moved into the shrink chamber to compress the shrink piston and the strut piston into the strut cylinder to reduce an overall length of the shock strut.

24 Claims, 10 Drawing Sheets

(56) References Cited

U.S. PATENT DOCUMENTS

2015/0274283 A1\* 10/2015 Luce ................ B64C 25/26
  244/104 FP
2019/0193846 A1\* 6/2019 Luce ................ B64C 25/60

FOREIGN PATENT DOCUMENTS

| EP | 2860102 | 4/2015 |
| EP | 2927117 | 10/2015 |
| RU | 2539433 | 5/2014 |

\* cited by examiner

SHOCK STRUT WITH INTEGRAL SHRINK PISTON ACTUATOR

FIELD

The present disclosure relates to landing gear, and more particularly, to systems and methods for shrink shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff. Struts sometimes need to shrink to fit in a wheel well.

SUMMARY

A shock strut is provided, comprising a strut cylinder, a strut piston operatively coupled to the strut cylinder, a shrink piston disposed at least partially within the strut cylinder, and a shrink chamber at least partially defined by the shrink piston, wherein the shrink piston comprises a shrink piston head, a sleeve extending from the shrink piston head, and a first mechanical stop.

In various embodiments, the shrink piston is slidably reciprocable within the strut cylinder.

In various embodiments, the strut piston is slidably reciprocable within the shrink piston.

In various embodiments, the shrink piston is in concentric alignment with the strut piston and the strut cylinder.

In various embodiments, the sleeve extends from an open end of the strut cylinder.

In various embodiments, the shock strut further comprises a shrink port disposed in the strut cylinder and in fluid communication with the shrink chamber.

In various embodiments, the strut piston comprises a second mechanical stop configured to mechanically engage the shrink piston in response to the strut piston compressing into the strut cylinder.

In various embodiments, the shrink piston compresses into the strut cylinder in response to the strut piston mechanically engaging the shrink piston.

In various embodiments, the shock strut further comprises an upper bearing disposed between the strut cylinder and the strut piston, wherein the shrink piston head is disposed between the strut cylinder and the strut piston; and a shrink chamber closure disposed between the strut cylinder and the shrink piston.

In various embodiments, the shock strut further comprises a recoil chamber at least partially defined by the upper bearing and the shrink piston, a vent orifice disposed in the shrink piston, a first seal configured to seal the recoil chamber, and a second seal configured to seal the shrink chamber, wherein the vent orifice routes a first fluid leaked from the first seal external the shock strut, and the vent orifice routes a second fluid leaked from the second seal external the shock strut.

A shock strut arrangement is provided, comprising an aircraft hydraulic system, a valve in fluid communication with the aircraft hydraulic system, and a shock strut, comprising a strut cylinder, a strut piston operatively coupled to the strut cylinder, a shrink piston disposed at least partially within the strut cylinder, a shrink chamber at least partially defined by the shrink piston, and a recoil chamber at least partially defined by the shrink piston, wherein the shrink chamber is in fluid communication with the valve.

In various embodiments, the recoil chamber receives a first fluid from the shock strut and the shrink chamber receives a second fluid from the aircraft hydraulic system.

In various embodiments, the shock strut arrangement further comprises a shrink port disposed in the strut cylinder and in fluid communication with the shrink chamber, whereby the shrink chamber receives the second fluid from the aircraft hydraulic system via the shrink port.

In various embodiments, the shock strut arrangement further comprises a first seal configured to seal the recoil chamber, a second seal configured to seal the shrink chamber, and a vent orifice disposed in the shrink piston, the vent orifice comprising an inlet disposed between the first seal and the second seal.

In various embodiments, the vent orifice is configured to route, via the inlet, a first fluid leaked from the recoil chamber externally from the shock strut, and the vent orifice is configured to route, via the inlet, a second fluid leaked from the shrink chamber externally from the shock strut.

In various embodiments, the shock strut arrangement further comprises an upper bearing at least partially defining the recoil chamber, and a shrink chamber closure at least partially defining the shrink chamber.

In various embodiments, the shrink piston comprises a shrink piston head, a sleeve extending from the shrink piston head, and a mechanical stop extending from the sleeve.

A method for shrinking a shock strut is disclosed, comprising positioning a shrink piston between a strut cylinder and a strut piston, wherein the shrink piston at least partially defines a recoil chamber and a shrink chamber, and moving a fluid into the shrink chamber, wherein the shock strut shrinks in response to the moving.

In various embodiments, the method further comprises moving the fluid from the shrink chamber, wherein the shock strut extends in response to the fluid being moved from the shrink chamber.

In various embodiments, the method further comprises coupling the shock strut to an aircraft hydraulic system such that the shrink chamber is in fluid communication with the aircraft hydraulic system.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Shock struts may be shrunk to fit in a wheel well. Shock struts of the present disclosure, in various embodiments, utilize an available power source that exists on most aircraft (e.g., a pressurized hydraulic fluid supply) to be utilized effectively to shrink the struts for retraction into a wheel well.

Figure 1A:
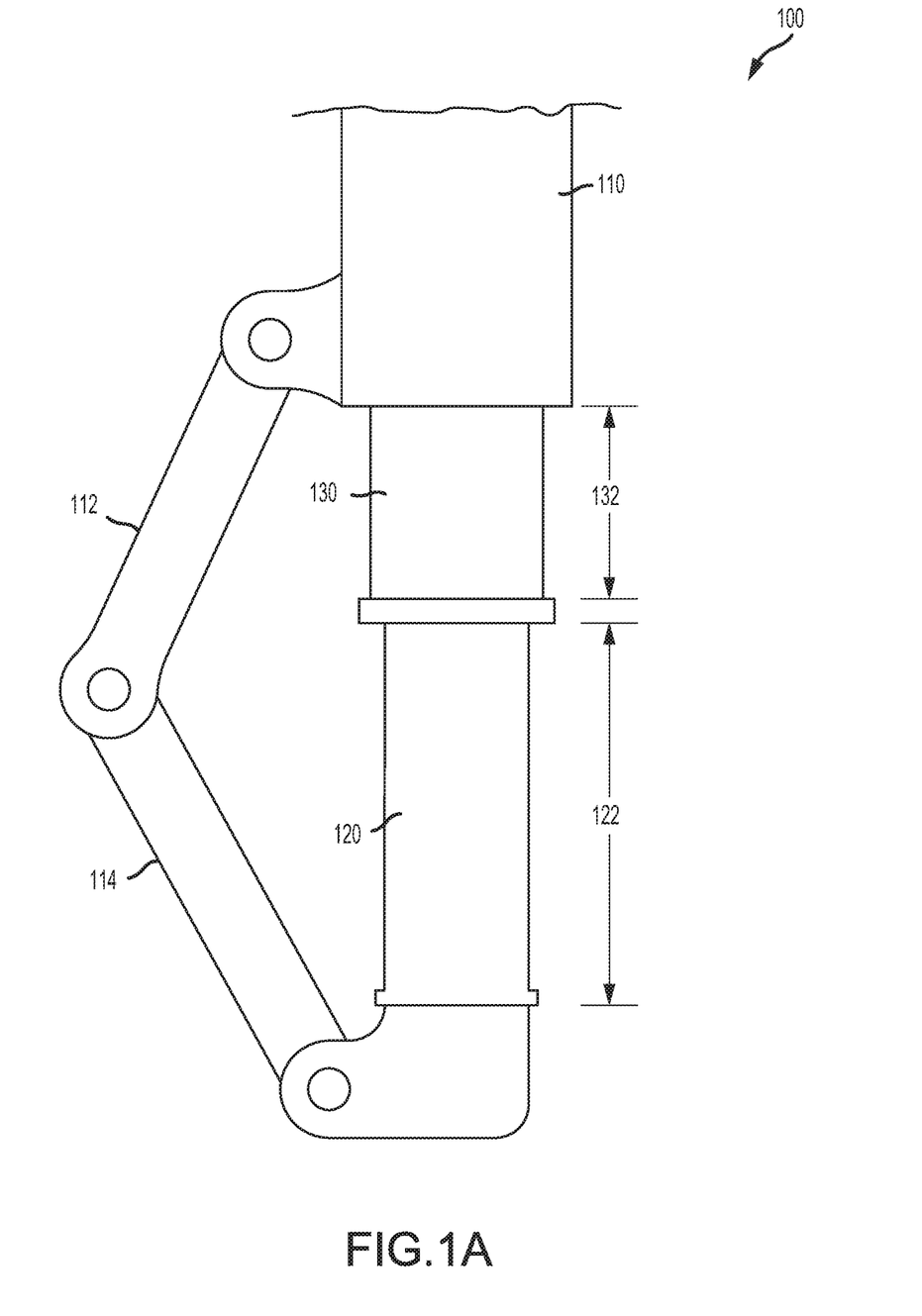
FIG. 1A illustrates a shock strut in a fully extended position, in accordance with various embodiments.

With reference to FIG. 1A, a shock strut 100 is illustrated in a fully extended position, in accordance with various embodiments. Shock strut 100 may comprise a strut cylinder 110, a strut piston actuator (strut piston) 120, and a shrink piston 130. Strut piston 120 may be operatively coupled to strut cylinder 110 as described herein. Strut piston 120 may be operatively coupled to shrink piston 130 as described herein. Strut cylinder 110 may be configured to receive strut piston 120 in a manner that allows the two components to telescope together and absorb and damp forces transmitted thereto. Shrink piston 130 may be operatively coupled to strut cylinder 110 as described herein. Shrink piston 130 may be configured to receive strut piston 120 in a manner that allows the two components to telescope together and absorb and damp forces transmitted thereto. Shrink piston 130 may be slidably reciprocable within strut cylinder 110. Strut piston 120 may be slidably reciprocable within shrink piston 130. In various embodiments, a liquid, such as a hydraulic fluid and/or oil may be located within strut cylinder 110. Further, a gas, such as nitrogen or air, may be located within strut cylinder 110. Strut cylinder 110 and strut piston 120 may be configured to seal such that fluid contained within strut cylinder 110 is prevented from leaking as strut piston 120 translates relative to strut cylinder 110. Strut cylinder 110 and shrink piston 130 may be configured to seal such that fluid contained within strut cylinder 110 is prevented from leaking as shrink piston 130 translates relative to strut cylinder 110.

In various embodiments, shock strut 100 may include an upper torque link arm 112 and a lower torque link arm 114. Upper torque link arm 112 may be pivotally coupled to strut cylinder 110. Upper torque link arm 112 may be pivotally coupled to lower torque link arm 114. Lower torque link arm 114 may be pivotally coupled to strut piston 120.

Shrink piston 130 may extend from strut cylinder 110 by a dimension (also referred to herein as a shrink stroke) 132. Strut piston 120 may extend from shrink piston 130 by a dimension (also referred to herein as a strut stroke) 122. In various embodiments, the total stroke of shock strut 100 (e.g., for landing and/or taxiing) may be dimension 122. In various embodiments, the total stroke of shock strut 100 (e.g., for landing and/or taxiing) may be a combination of dimension 122 and dimension 132. The total stroke of shock strut 100 (e.g., for landing and/or taxiing) may be determined by the design of shock strut 100.

Figure 1B:
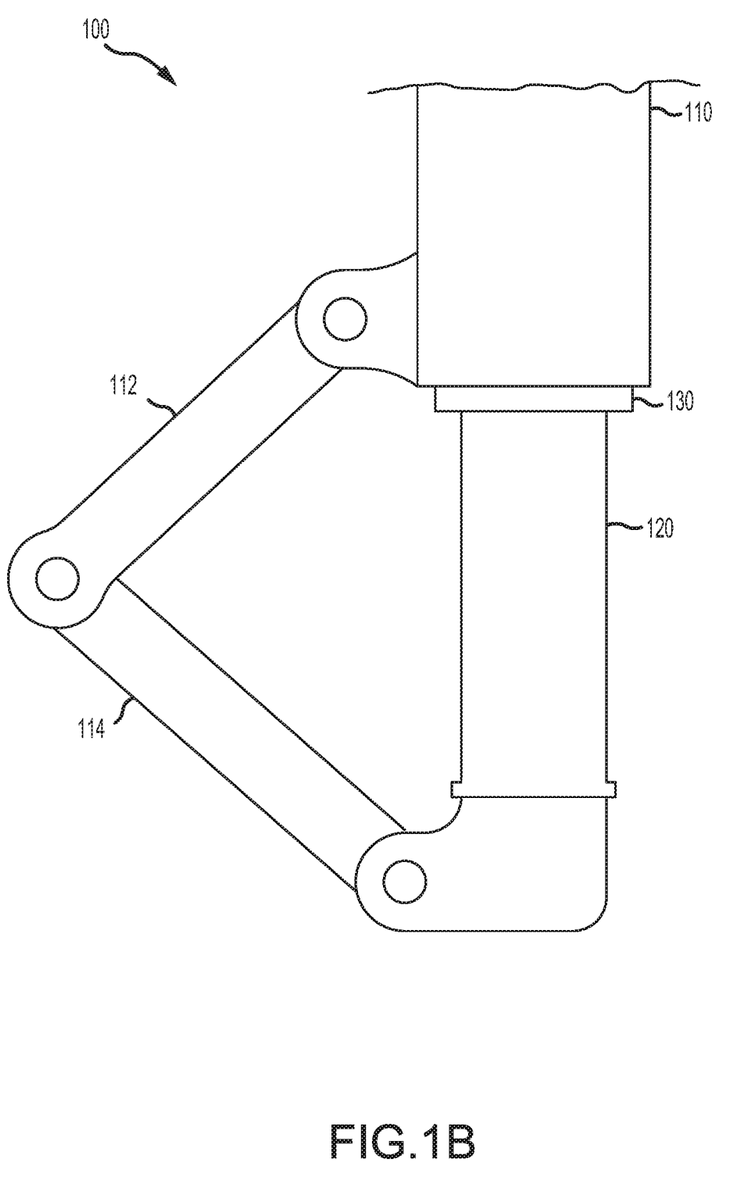
FIG. 1B illustrates the shock strut of FIG. 1A in a shrunk position, in accordance with various embodiments.

With reference to FIG. 1B, shock strut 100 is illustrated in a shrunk position, in accordance with various embodiments. With combined reference to FIG. 1A and FIG. 1B, dimension 132 may be zero in response to shock strut 100 being in the shrunk position.

Figure 1C:
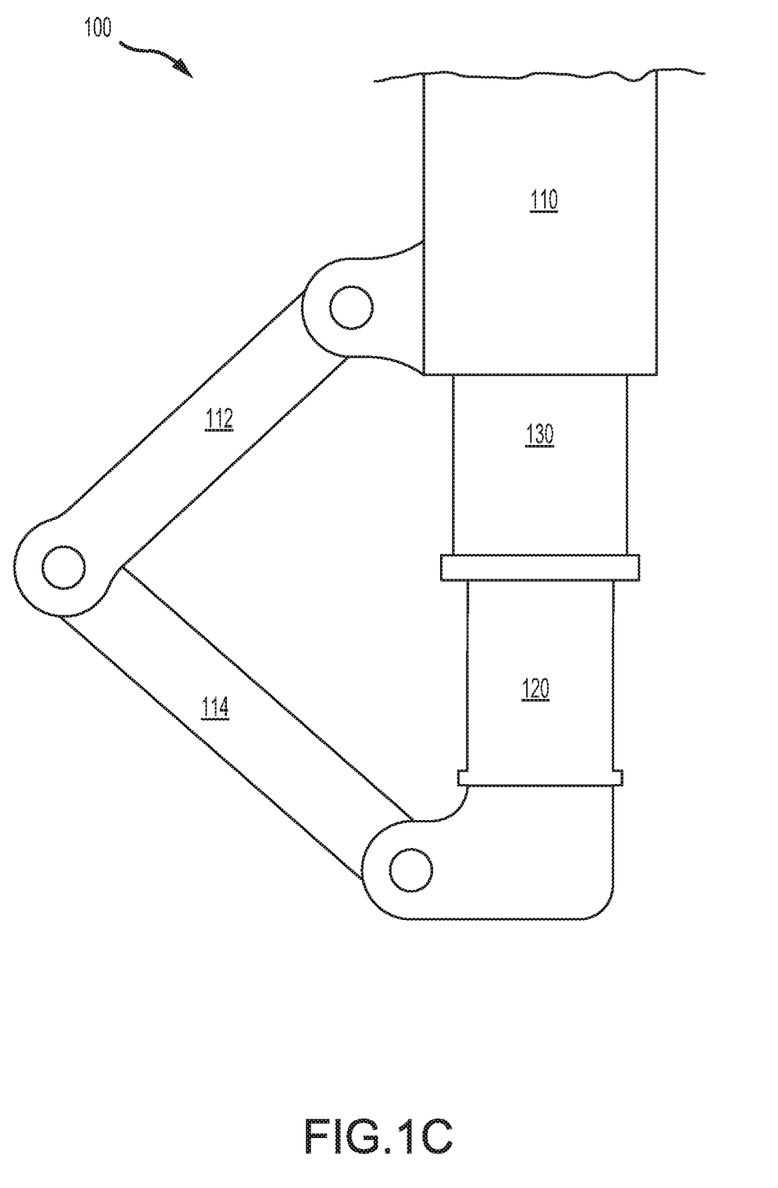
FIG. 1C illustrates the shock strut of FIG. 1A in a static position with the strut piston partially compressed into the shrink piston, in accordance with various embodiments.

With reference to FIG. 1C, shock strut 100 is illustrated in a static position, in accordance with various embodiments. With combined reference to FIG. 1A and FIG. 1C, dimension 132 may be between a maximum value (i.e., dimension 132 illustrated in FIG. 1A) and a minimum value in response to shock strut 100 being in the static position. Stated differently, shrink piston 130 may be partially compressed into strut cylinder 110 in response to shock strut 100 being in the static position. Furthermore, dimension 122 may be between a maximum value and a minimum value (i.e., zero as illustrated in FIG. 1C) in response to shock strut 100 being in the static position. Stated differently, strut piston 120 may be partially compressed into shrink piston 130 in response to shock strut 100 being in the static position.

Figure 1D:
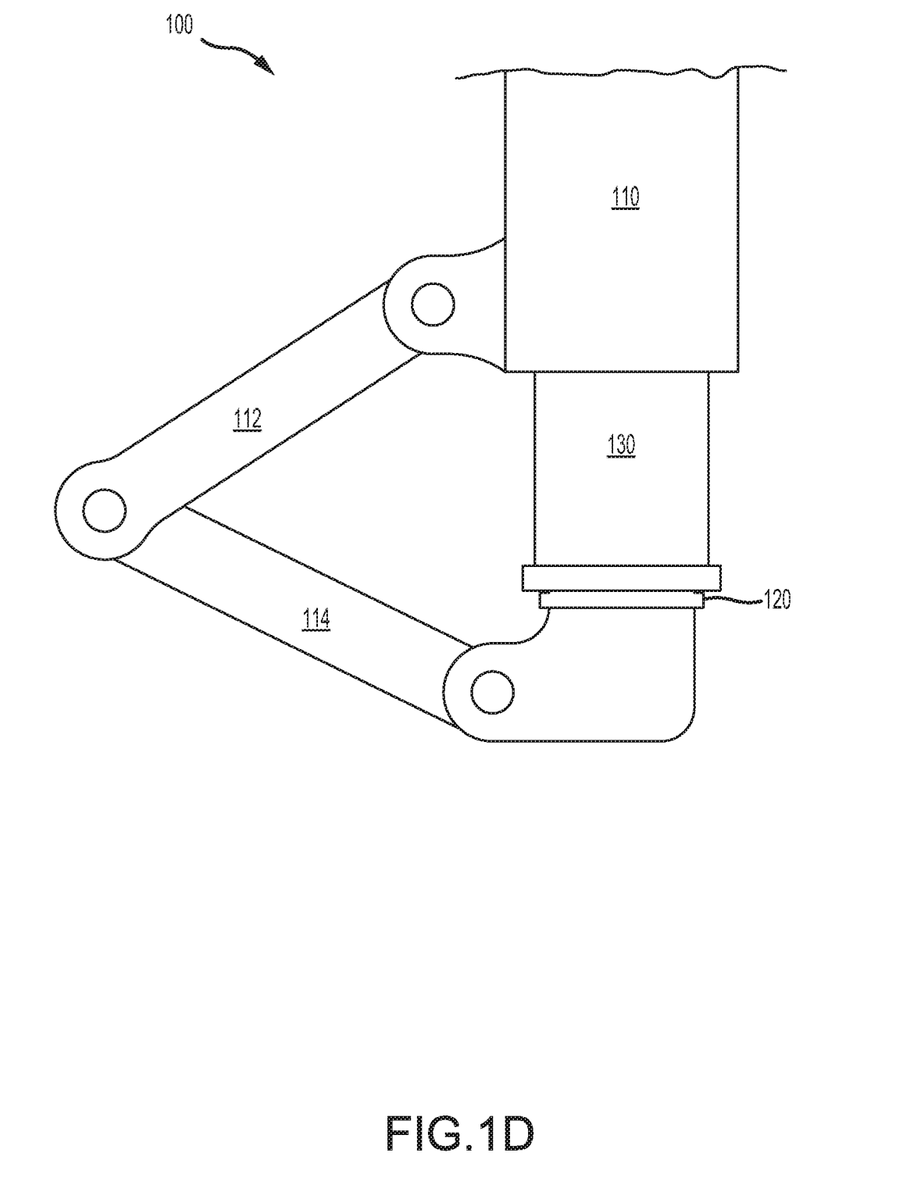
FIG. 1D illustrates the shock strut of FIG. 1A in a static position with the strut piston fully compressed into the shrink piston, in accordance with various embodiments.

With reference to FIG. 1D, shock strut 100 is illustrated in a static position, in accordance with various embodiments. In various embodiments, strut piston 120 may be at a maximum stroke in response to shock strut 100 being in a static position. Stated differently, depending on the design of shock strut 100, strut piston 120 may be partially compressed into shrink piston 130, as illustrated in FIG. 1C, when shock strut 100 is in the static position, or strut piston 120 may fully compressed into shrink piston 130, as illustrated in FIG. 1D, when shock strut 100 is in the static position.

Figure 2A:
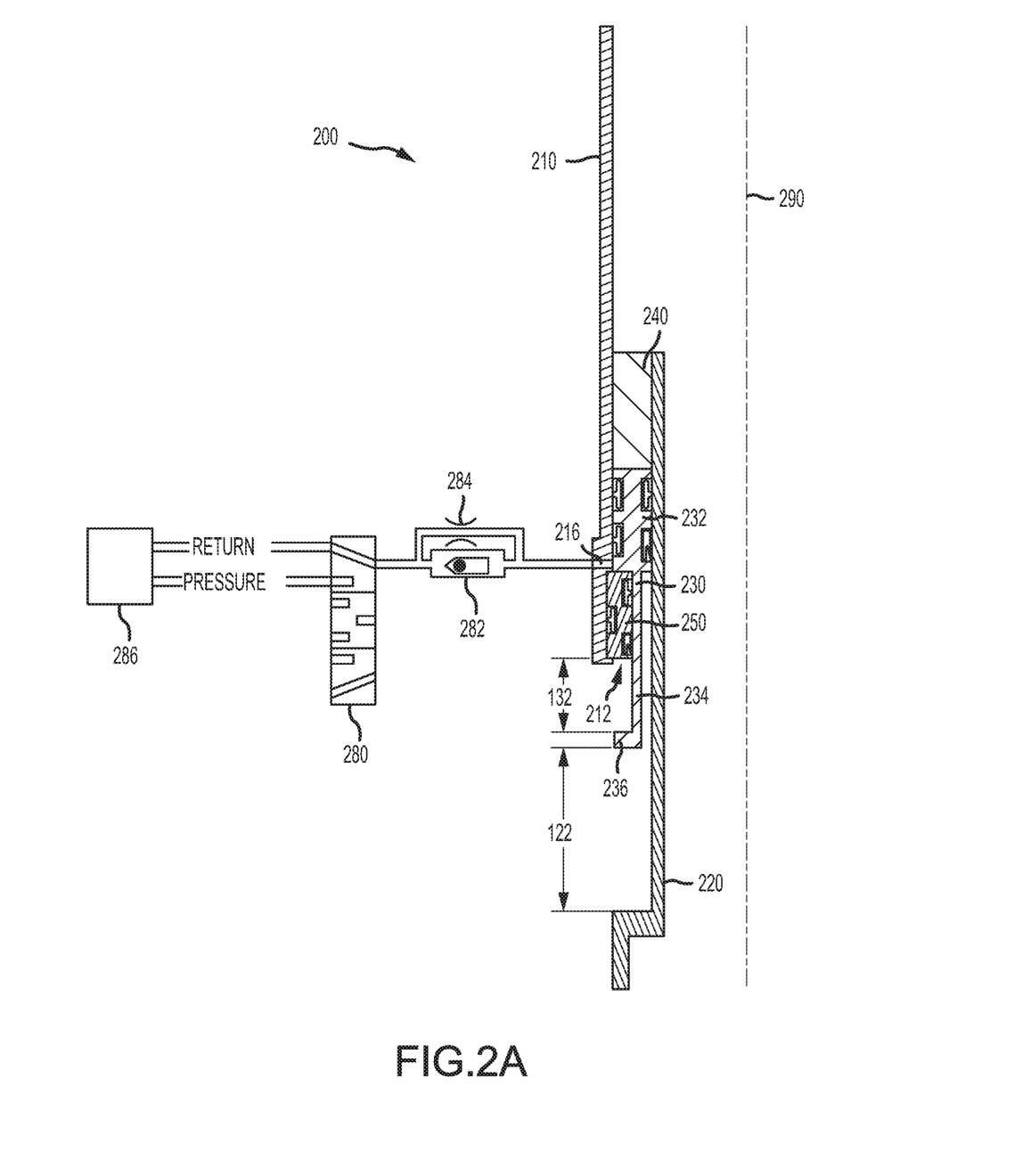
FIG. 2A illustrates a section view of a shock strut in a fully extended position, in accordance with various embodiments.

With respect to FIG. 2A, elements with like element numbering, as depicted in FIG. 1A, are intended to be the same and will not necessarily be repeated for the sake of clarity.

With reference to FIG. 2A, a section view of a shock strut 200 is illustrated, in accordance with various embodiments. In various embodiments, shock strut 100 of FIG. 1A may be similar to shock strut 200. Shock strut 200 may comprise a strut cylinder 210, a strut piston 220, and a shrink piston actuator (shrink piston) 230. Strut cylinder 210, strut piston 220, and shrink piston 230 may be disposed concentric with respect to centerline axis 290. Shock strut 200 may further comprise an upper bearing 240. Upper bearing 240 may be coupled between strut cylinder 210 and strut piston 220. Upper bearing 240 may aid in the translation of strut piston 220 relative to strut cylinder 210. Upper bearing 240 may surround strut piston 220. Upper bearing 240 may be coupled to and translate with strut piston 220.

Shock strut 200 may further comprise and a shrink chamber closure 250. Shrink chamber closure 250 may be coupled between strut cylinder 210 and shrink piston 230. Shrink chamber closure 250 may aid in the translation of shrink piston 230 relative to strut cylinder 210. Shrink chamber closure 250 may surround shrink piston 230. Shrink chamber closure 250 may comprise a seal. Shrink chamber closure 250 may comprise an annular geometry. Shrink chamber closure 250 may comprise metal, plastic, rubber, or any other suitable material.

In various embodiments, shrink piston 230 may comprise a shrink piston head 232 and a shrink piston sleeve 234. Shrink piston head 232 may engage strut cylinder 210 at an outer surface of shrink piston head 232 and may engage strut piston 220 at an inner surface of shrink piston head 232. Shrink piston head 232 may act as a lower shock strut bearing to aid in transferring ground loads from piston 220 into cylinder 210. Shrink piston sleeve 234 may extend from shrink piston head 232 in a direction parallel to centerline 290. Shrink piston sleeve 234 may extend from an open end 212 of strut cylinder 210. Shrink chamber closure 250 may be disposed between strut cylinder 210 and shrink piston sleeve 234. A mechanical stop (also referred to herein as a first mechanical stop) 236 may be disposed at the opposite end of shrink piston sleeve 234 from shrink piston head 232. Mechanical stop 236 may be configured to engage shrink chamber closure 250. Mechanical stop 236 may be configured to engage strut cylinder 210. Mechanical stop 236 may prevent shrink piston 230 from compressing into strut cylinder 210 in response to mechanical stop 236 engaging shrink chamber closure 250 and/or strut cylinder 210. Mechanical stop 236 may extend radially outward, with respect to centerline 290, from shrink piston sleeve 234. Mechanical stop 236 may comprise a tab or a flange, for example.

With respect to FIG. 2B through FIG. 2E, elements with like element numbering, as depicted in FIG. 2A, are intended to be the same and will not necessarily be repeated for the sake of clarity.

Figure 2B:
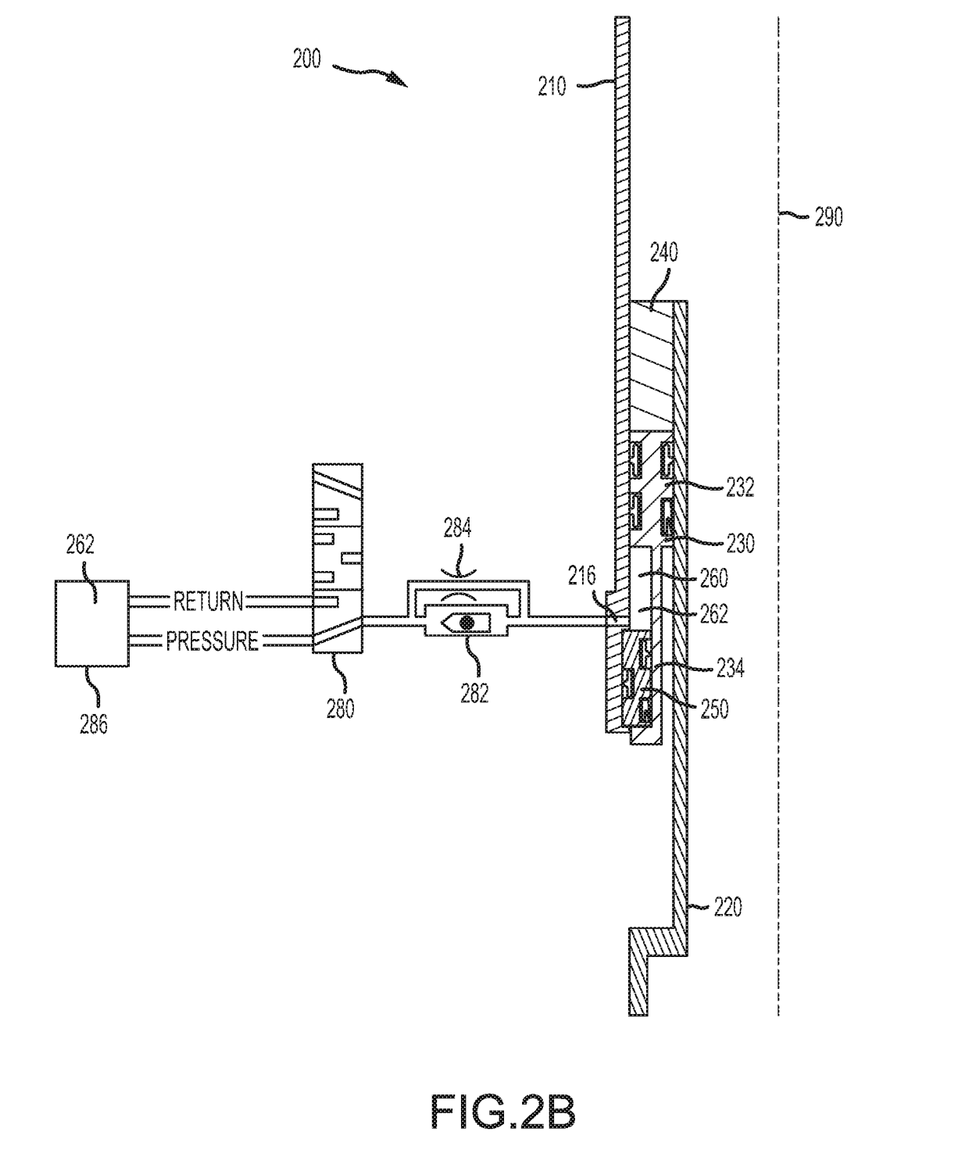
FIG. 2B illustrates a section view of the shock strut of FIG. 2A in a shrunk position, in accordance with various embodiments.

With combined reference to FIG. 2A and FIG. 2B, a shrink chamber 260 may be defined between strut cylinder 210 and shrink piston 230. In various embodiments, shrink chamber 260 may further be defined by shrink chamber closure 250. An aperture (also referred to herein as a shrink port) 216 may be disposed in strut cylinder 210, in accordance with various embodiments. Port 216 may be in fluid communication with shrink chamber 260. Shrink chamber 260 may receive a hydraulic fluid 262 from a hydraulic fluid supply 286 (e.g., an aircraft hydraulic system), schematically illustrated in FIG. 2A through FIG. 2D, via port 216. Shrink piston 230 may compress into strut cylinder 210 in response to hydraulic fluid moving into shrink chamber 260. Stated differently, a hydraulic fluid (also referred to herein as a second fluid) 262 in shrink chamber 260 may force shrink piston 230 and strut piston 220 to compress into strut cylinder 210. The overall length of shock strut 200 may decrease in response to shrink piston 230 compressing in strut cylinder 210.

In various embodiments, a valve 280 may be in fluid communication with port 216. A check valve 282 and a restrictor 284 may be coupled in parallel between valve 280 and port 216. Check valve 282 may be a one-way check valve which prevents hydraulic fluid from traveling from shrink chamber 260 to valve 280, via check valve 282. Restrictor 284 may restrict the flow of hydraulic fluid between shrink chamber 260 and valve 280. Valve 280 may be configured to disconnect port 216 from a pressure side of hydraulic fluid supply 286 (e.g., see FIG. 2A). Valve 280 may be configured to connect port 216 to the pressure side of hydraulic fluid supply 286 (e.g., see FIG. 2B). Valve 280 may be configured to disconnect port 216 from a return side of hydraulic fluid supply 286 (e.g., see FIG. 2B). Valve 280 may be configured to connect port 216 to the return side of hydraulic fluid supply 286 (e.g., see FIG. 2A). Valve 280 may be configured to completely disconnect port 216 from hydraulic fluid supply 286, for example during flight.

Figure 2C:
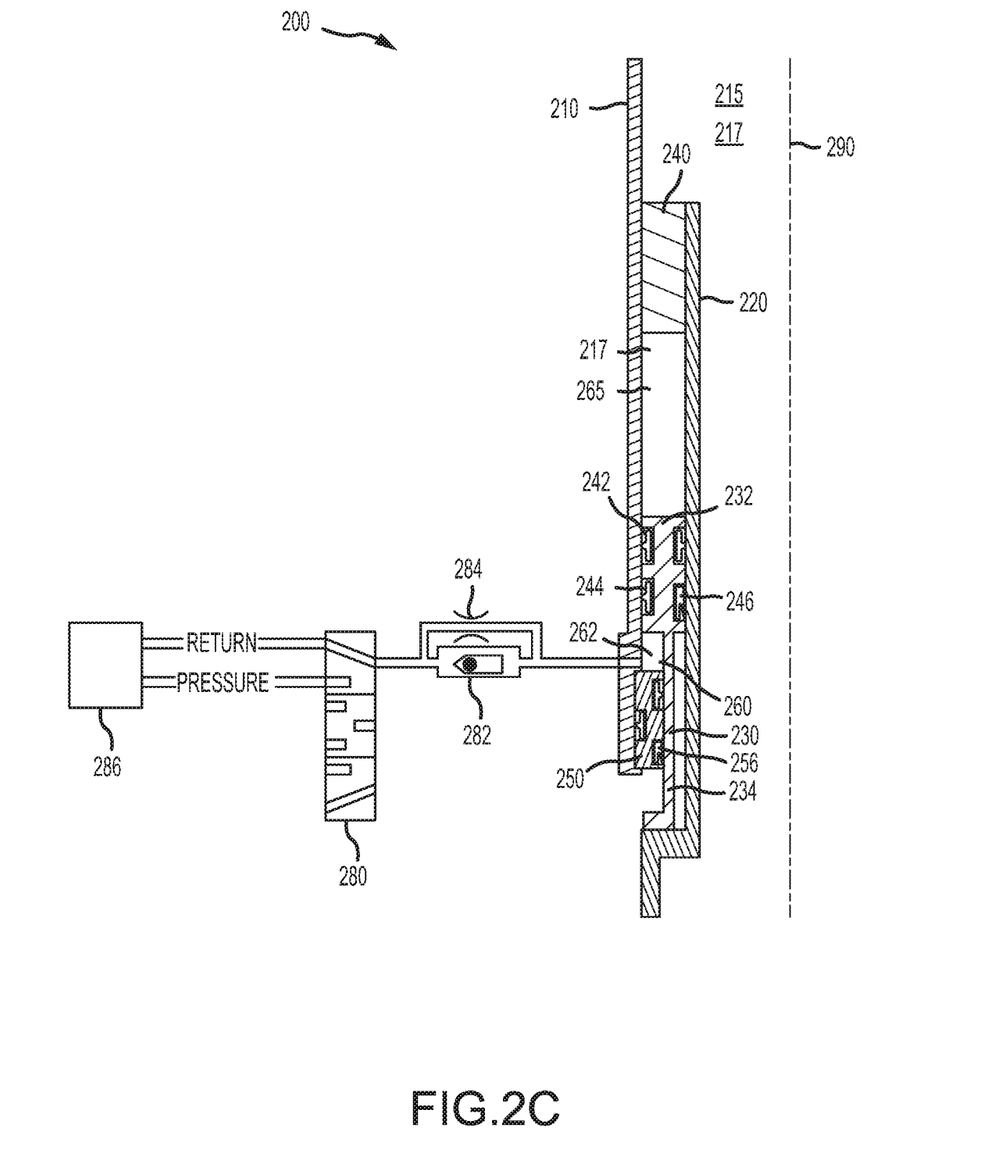
FIG. 2C illustrates a section view of the shock strut of FIG. 2A in a static position, in accordance with various embodiments.

With reference to FIG. 2C, shock strut 200 is illustrated in a static position, in accordance with various embodiments. A recoil chamber 265 may be defined between strut cylinder 210 and strut piston 220. Recoil chamber 265 may be further defined between shrink piston 230 and upper bearing 240. Recoil chamber 265 may receive hydraulic fluid from strut cylinder 210. In this regard, a hydraulic fluid (also referred to herein as a first fluid) 217 may enter recoil chamber 265 from strut cylinder chamber 215, for example, via an orifice in upper bearing 240 or an orifice in strut piston 220. Hydraulic fluid 217 in recoil chamber 265 may damp movement of strut piston 220 relative to strut cylinder 210.

In various embodiments, shrink piston head 232 may include an upper seal (also referred to herein as a first seal) 242 and a lower seal (also referred to herein as a second seal) 244. Upper seal 242 may seal recoil chamber 265. Upper seal 242 may prevent hydraulic fluid 217 from leaking past seal 242. Lower seal 244 may seal shrink chamber 260. Lower seal 244 may prevent hydraulic fluid 262 from leaking past seal 244. In various embodiments, hydraulic fluid 217 and hydraulic fluid 262 may be different types of hydraulic fluid. For example, hydraulic fluid 217 may comprise a mineral oil and hydraulic fluid 262 may comprise a phosphate ester.

In various embodiments, shrink piston head 232 may include a scraper 246. Scraper 246 may be disposed between shrink piston head 232 and strut piston 220. Scraper 246 may scrape against strut piston 220 as strut piston 220 translates relative to shrink piston 230. Scraper 246 may aid in maintaining the outer surface of strut piston 220 clean. In various embodiments, shrink chamber closure 250 may include a scraper 256. Scraper 256 may be disposed between shrink chamber closure 250 and shrink piston 230. Scraper 256 may scrape against shrink piston 230 as shrink piston 230 translates relative to shrink chamber closure 250. Scraper 256 may aid in maintaining the outer surface of shrink piston 230 clean.

Figure 2D:
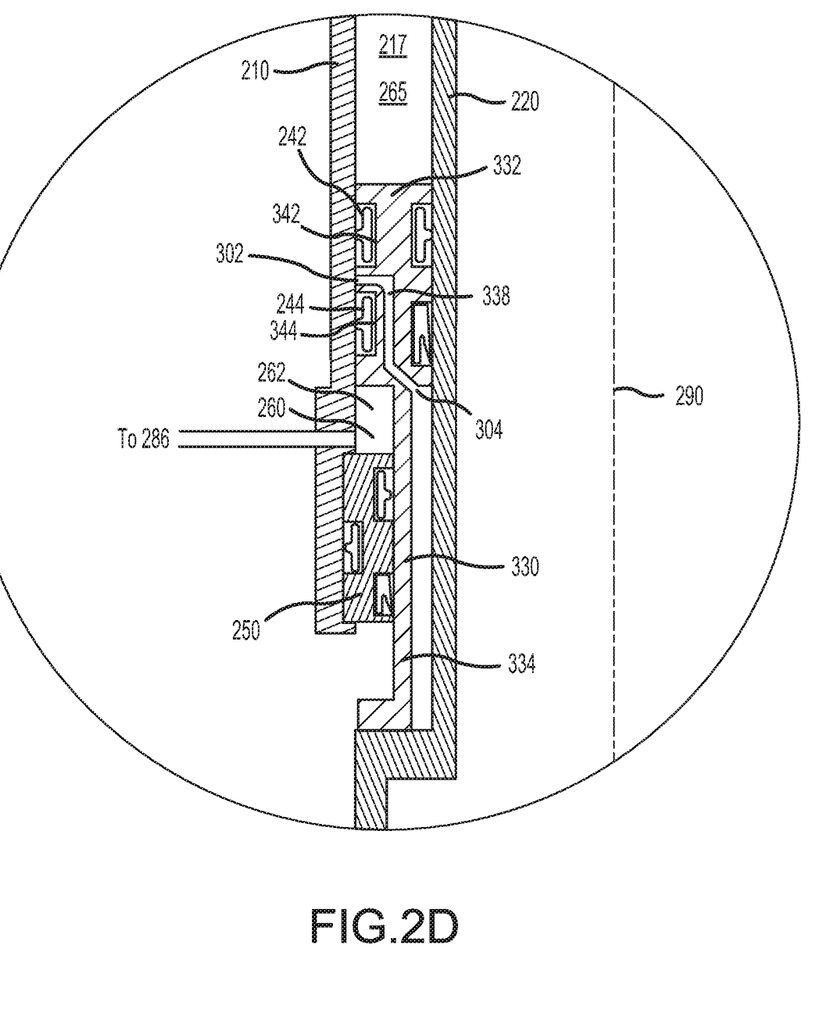
FIG. 2D illustrates a section view of the shock strut of FIG. 2C having a shrink piston comprising a vent orifice, in accordance with various embodiments.

With respect to FIG. 2D, elements with like element numbering, as depicted in FIG. 2C, are intended to be the same and will not necessarily be repeated for the sake of clarity.

With reference to FIG. 2D, an enlarged view of a shrink piston 330 is illustrated, in accordance with various embodiments. Shrink piston 330 may be similar to shrink piston 230 of FIG. 2C, except that shrink piston 230 further includes a vent orifice 338. In this regard, shrink piston 330 may include a shrink piston head 332 and a shrink piston sleeve 334. A first groove 342 may be disposed in shrink piston head 332. Upper seal 242 may be disposed in first groove 342. A second groove 344 may be disposed in shrink piston head 332. Lower seal 244 may be disposed in second groove 344. Vent orifice 338 may be disposed in shrink piston 330. Vent orifice 338 may comprise an inlet 302 disposed between first groove 342 and second groove 344. In the event that hydraulic fluid 262 leaks from shrink chamber 260, past lower seal 244, the leaked fluid may flow upwards from shrink chamber 260 towards inlet 302 and enter vent orifice 338, via inlet 302. This fluid leaked from shrink chamber 260 may exit strut cylinder 210 via outlet 304 of vent orifice 338. In the event that hydraulic fluid 217 leaks from recoil chamber 265, past upper seal 242, the leaked fluid may flow downwards from recoil chamber 265 towards inlet 302 and enter vent orifice 338, via inlet 302. This fluid leaked from recoil chamber 265 may exit strut cylinder 210 via outlet 304 of vent orifice 338. Stated differently, vent orifice 338 may route hydraulic fluid 262 and/or hydraulic fluid 217 to a location external strut cylinder 210. In this regard, vent orifice 338 may prevent hydraulic fluid 262 from mixing with hydraulic fluid 217.

Figure 2E:
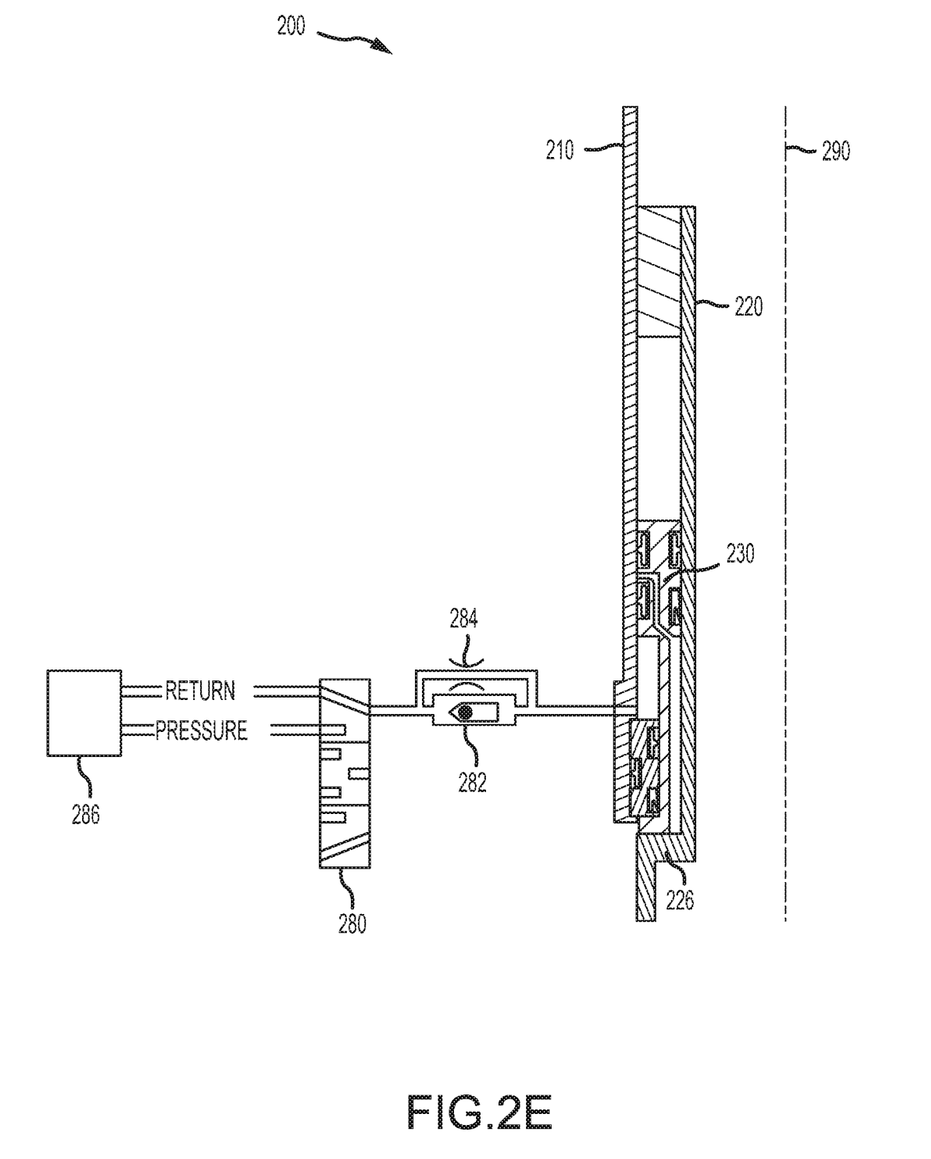
FIG. 2E illustrates a section view of the shock strut of FIG. 2A in a fully compressed position, in accordance with various embodiments.

With reference to FIG. 2E, shock strut 200 is illustrated in a fully compressed position, in accordance with various embodiments. Strut piston 220 may include a mechanical stop (also referred to herein as a second mechanical stop) 226. Mechanical stop 226 may comprise a tab or a flange. Mechanical stop 226 may engage with shrink piston 230 in response to shock strut 200 being in the fully compressed position.

With combined reference to FIG. 2C and FIG. 2E, as strut piston 220 compresses into strut cylinder 210, strut piston 220 may mechanically engage shrink piston 230 (e.g., mechanical stop 226 may engage shrink piston 230). Further compression of strut piston 220 may drive shrink piston 230 to compress into strut cylinder 210. As strut piston 220 drives shrink piston 230 into strut cylinder 210, shrink piston 230 may pull hydraulic fluid from hydraulic fluid supply 286 into shrink chamber 260, via open check valve 282 (e.g., in response to shock strut 200 moving from a static position to a fully compressed position). As shrink piston 230 extends from strut cylinder 210, shrink piston 230 may push hydraulic fluid from shrink chamber 260 to hydraulic fluid supply 286, via restrictor 284 (e.g., in response to shock strut 200 moving from a compressed position to an extended position and in response to check valve 282 becoming closed).

Figure 3:
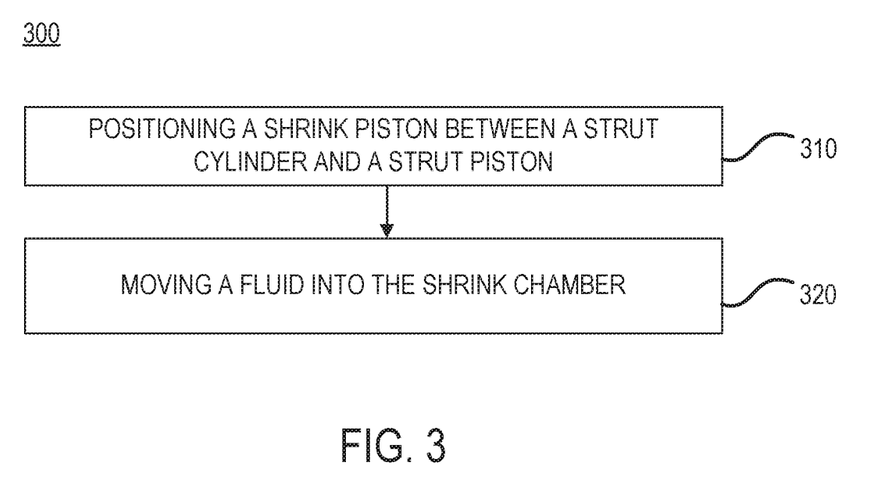
FIG. 3 illustrates a method for shrinking a shock strut, in accordance with various embodiments.

With reference to FIG. 3, a method 300 for shrinking a shock strut is provided, in accordance with various embodiments. Method 300 includes positioning a shrink piston between a strut cylinder and a strut piston (step 310). Method 300 includes moving a fluid into the shrink chamber (step 320).

With combined reference to FIG. 2B and FIG. 3, step 310 may include positioning shrink piston 230 between strut cylinder 210 and strut piston 220. For example, shrink piston 230 may be positioned around strut piston 220 and then shrink piston 230 and strut piston 220 may be translated, as an assembly, into strut cylinder 210. However, it is contemplated herein that shrink piston 230 and strut piston 220 may be individually positioned within strut cylinder 210. Step 320 may include moving hydraulic fluid 262 into shrink chamber 260.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock strut, comprising:
a strut cylinder;
a strut piston operatively coupled to the strut cylinder;
a shrink piston disposed partially within and partially extending from and open end of the strut cylinder; and
a shrink chamber at least partially defined by the shrink piston;
wherein the shrink piston comprises:
a shrink piston head;

a sleeve extending from the shrink piston head; and
a first mechanical stop.

2. The shock strut of claim 1, wherein the shrink piston is slidably reciprocable within the strut cylinder.

3. The shock strut of claim 2, wherein the strut piston is slidably reciprocable within the shrink piston.

4. The shock strut of claim 3, wherein the shrink piston is in concentric alignment with the strut piston and the strut cylinder.

5. (Proposed Amended) The shock strut of claim 4, wherein the sleeve extends from the open end of the strut cylinder.

6. The shock strut of claim 5, further comprising a shrink port disposed in the strut cylinder and in fluid communication with the shrink chamber.

7. The shock strut of claim 1, wherein the strut piston comprises a second mechanical stop configured to mechanically engage the shrink piston in response to the strut piston compressing into the strut cylinder.

8. The shock strut of claim 7, wherein the shrink piston compresses into the strut cylinder in response to the strut piston mechanically engaging the shrink piston.

9. The shock strut of claim 1, further comprising:
an upper bearing disposed between the strut cylinder and the strut piston, wherein the shrink piston head is disposed between the strut cylinder and the strut piston; and
a shrink chamber closure disposed between the strut cylinder and the shrink piston.

10. The shock strut of claim 9, further comprising:
a recoil chamber at least partially defined by the upper bearing and the shrink piston;
a vent orifice disposed in the shrink piston;
a first seal configured to seal the recoil chamber; and
a second seal configured to seal the shrink chamber,
wherein the vent orifice routes a first fluid leaked from the first seal external the shock strut; and
the vent orifice routes a second fluid leaked from the second seal external the shock strut.

11. A shock strut arrangement, comprising:
an aircraft hydraulic system;
a valve in fluid communication with the aircraft hydraulic system; and
a shock strut, comprising:
a strut cylinder;
a strut piston operatively coupled to the strut cylinder;
a shrink piston disposed partially within and partially extending from and open end of the strut cylinder;
a shrink chamber at least partially defined by the shrink piston; and
a recoil chamber at least partially defined by the shrink piston;
wherein the shrink chamber is in fluid communication with the valve.

12. The shock strut arrangement of claim 11, wherein the recoil chamber receives a first fluid from the shock strut and the shrink chamber receives a second fluid from the aircraft hydraulic system.

13. The shock strut arrangement of claim 12, further comprising a shrink port disposed in the strut cylinder and in fluid communication with the shrink chamber, whereby the shrink chamber receives the second fluid from the aircraft hydraulic system via the shrink port.

14. The shock strut arrangement of claim 11, further comprising:
a first seal configured to seal the recoil chamber;
a second seal configured to seal the shrink chamber; and
a vent orifice disposed in the shrink piston, the vent orifice comprising an inlet disposed between the first seal and the second seal.

15. The shock strut arrangement of claim 14, wherein the vent orifice is configured to route, via the inlet, a first fluid leaked from the recoil chamber externally from the shock strut, and
the vent orifice is configured to route, via the inlet, a second fluid leaked from the shrink chamber externally from the shock strut.

16. The shock strut arrangement of claim 11, further comprising:
an upper bearing at least partially defining the recoil chamber; and
a shrink chamber closure at least partially defining the shrink chamber.

17. The shock strut arrangement of claim 11, wherein the shrink piston comprises:
a shrink piston head;
a sleeve extending from the shrink piston head; and
a mechanical stop extending from the sleeve.

18. A method for shrinking a shock strut, the shock strut comprising:
a strut cylinder;
a strut piston operatively coupled to the strut cylinder;
a shrink piston disposed partially within and partially extending from and open end of the strut cylinder;
a shrink chamber at least partially defined by the shrink piston; and
a recoil chamber at least partially defined by the shrink piston;
wherein the shrink chamber is in fluid communication with the valve;
the method comprising:
and
moving a fluid into the shrink chamber, wherein the shock strut shrinks in response to the moving.

19. The method of claim 18, further comprising moving the fluid from the shrink chamber, wherein the shock strut extends in response to the fluid being moved from the shrink chamber.

20. The method of claim 18, further comprising coupling the shock strut to an aircraft hydraulic system such that the shrink chamber is in fluid communication with the aircraft hydraulic system.

21. A shock strut, comprising:
a strut cylinder;
a strut piston operatively coupled to the strut cylinder;
a shrink piston disposed at least partially within the strut cylinder; and
a shrink chamber at least partially defined by the shrink piston;
wherein the shrink piston comprises:
a shrink piston head;
a sleeve extending from the shrink piston head; and
a first mechanical stop,
wherein the strut piston comprises a second mechanical stop configured to mechanically engage the shrink piston in response to the strut piston compressing into the strut cylinder.

22. A shock strut, comprising:
a strut cylinder;
a strut piston operatively coupled to the strut cylinder;
a shrink piston disposed at least partially within the strut cylinder, wherein the shrink piston comprises a shrink piston head, a sleeve extending from the shrink piston head, and a first mechanical stop;

a shrink chamber at least partially defined by the shrink piston;

an upper bearing disposed between the strut cylinder and the strut piston, wherein the shrink piston head is disposed between the strut cylinder and the strut piston; and a shrink chamber closure disposed between the strut cylinder and the shrink piston.

23. A shock strut arrangement, comprising:

an aircraft hydraulic system;

a valve in fluid communication with the aircraft hydraulic system; and a shock strut, comprising:
  a strut cylinder;
  a strut piston operatively coupled to the strut cylinder;
  a shrink piston disposed at least partially within the strut cylinder;
  a shrink chamber at least partially defined by the shrink piston;
  a recoil chamber at least partially defined by the shrink piston;
  a first seal configured to seal the recoil chamber;
  a second seal configured to seal the shrink chamber; and
  a vent orifice disposed in the shrink piston, the vent orifice comprising an inlet disposed between the first seal and the second seal,
  wherein the shrink chamber is in fluid communication with the valve.

24. A shock strut arrangement, comprising:

an aircraft hydraulic system;

a valve in fluid communication with the aircraft hydraulic system; and a shock strut, comprising:
  a strut cylinder;
  a strut piston operatively coupled to the strut cylinder;
  a shrink piston disposed at least partially within the strut cylinder, the shrink piston comprises a shrink piston head, a sleeve extending from the shrink piston head, and a mechanical stop extending from the sleeve;
  a shrink chamber at least partially defined by the shrink piston; and
  a recoil chamber at least partially defined by the shrink piston;
  wherein the shrink chamber is in fluid communication with the valve.

* * * * *